(12) United States Patent
Pasternak

(10) Patent No.: US 9,207,446 B2
(45) Date of Patent: Dec. 8, 2015

(54) SCANNING SPACE OBSERVATION OPTICAL SYSTEM

(71) Applicant: AIRBUS DEFENCE AND SPACE SAS, Les Mureaux (FR)

(72) Inventor: Frederick Pasternak, Gaure (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 0 days.

(21) Appl. No.: 14/563,976

(22) Filed: Dec. 8, 2014

(65) Prior Publication Data

US 2015/0168708 A1 Jun. 18, 2015

(30) Foreign Application Priority Data

Dec. 13, 2013 (FR) ...................... 13 62608

(51) Int. Cl.
| | |
|---|---|
| G02B 26/08 | (2006.01) |
| G02B 23/02 | (2006.01) |
| G02B 26/10 | (2006.01) |
| G01C 21/02 | (2006.01) |
| G01S 3/786 | (2006.01) |
| G02B 17/06 | (2006.01) |
| G02B 27/64 | (2006.01) |

(52) U.S. Cl.
CPC .............. *G02B 23/02* (2013.01); *G01C 21/025* (2013.01); *G01S 3/786* (2013.01); *G02B 17/0663* (2013.01); *G02B 26/10* (2013.01); *G02B 26/105* (2013.01); *G02B 27/642* (2013.01)

(58) Field of Classification Search
CPC .. G02B 26/10; G02B 26/105; G02B 17/0663; G02B 27/642; G02B 23/02; G01C 21/025; G01C 3/786

USPC ........... 359/205.1, 207.1, 209.1–212.1, 226.1
See application file for complete search history.

(56) References Cited

U.S. PATENT DOCUMENTS

| | | |
|---|---|---|
| 3,449,035 A | 6/1969 | Denaro |
| 5,018,844 A | 5/1991 | Horton |
| 5,923,359 A | 7/1999 | Montgomery |
| 2006/0012669 A1* | 1/2006 | Taniguchi ............ G03G 15/326 347/243 |

FOREIGN PATENT DOCUMENTS

| | | |
|---|---|---|
| EP | 0170317 A1 | 2/1986 |
| WO | 98/02769 A1 | 1/1998 |

* cited by examiner

*Primary Examiner* — James Phan
(74) *Attorney, Agent, or Firm* — Im IP Law PLLC; C. Andrew Im

(57) ABSTRACT

An optical system has a rotary scanning mirror, an optical instrument and an optical image rotation device. The rotary scanning mirror receives an incident beam of rays and returns an input beam along a first axis. The optical instrument receives the input beam from the scanning mirror and returns an output beam parallel to the input beam along a second axis in a direction opposite to the input beam towards the optical rotation device. The optical image rotation device is positioned on the second axis and receives the output beam. The scanning mirror has an axis of rotation aligned on the first axis. The optical image rotation device has an axis of rotation aligned on the second axis. The optical system comprises a common driving device for rotationally driving the optical image rotation device and the scanning mirror about their respective rotation axes.

7 Claims, 3 Drawing Sheets

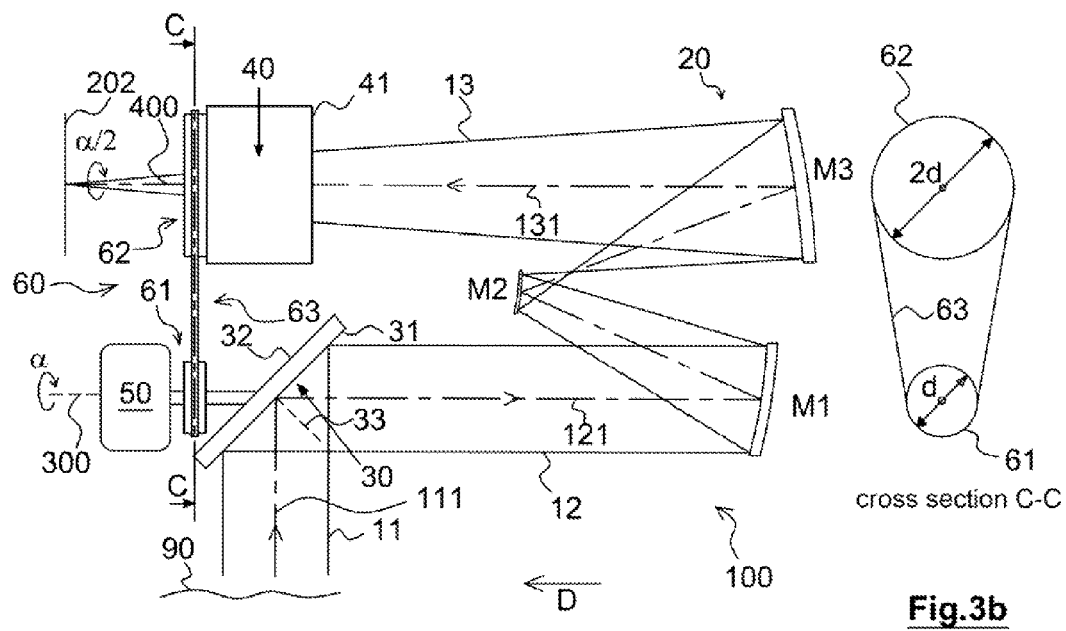
Fig.3a
Fig.3b
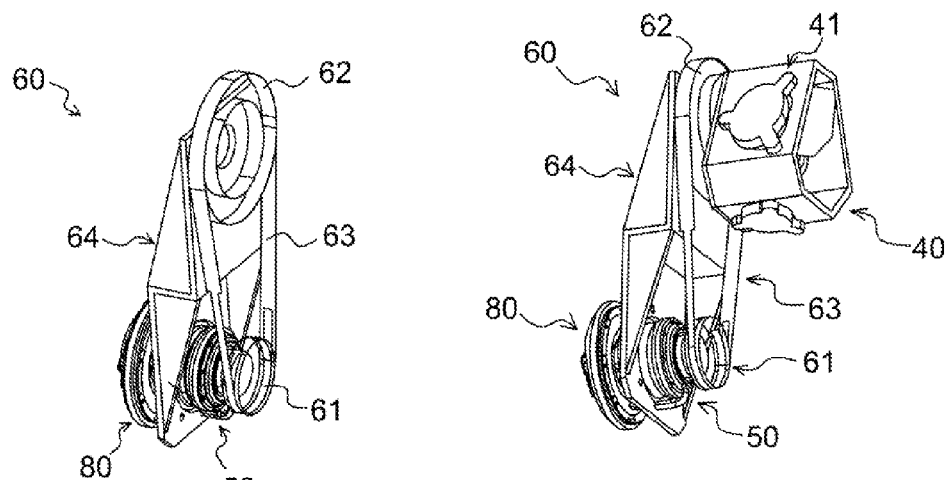
Fig.4
Fig.5

SCANNING SPACE OBSERVATION OPTICAL SYSTEM

RELATED APPLICATIONS

This application claims priority from French Patent Application No. 13 62608 filed Dec. 13, 2013, which is herein incorporated by reference in its entirety.

FIELD OF THE INVENTION

The present invention belongs to the field of optical systems for space observation. More particularly, the present invention relates to scanning optical systems for non-stationary satellites.

STATE OF THE ART

An optical system for space observation is an optical system installed on a satellite and making it possible to collect information on the Earth, the stars, the planets, etc., via the recording of high resolution images. Such an optical system comprises, among other things, a telescope, for example of Cassegrain, Korsch, Newton, and other such types.

Some optical systems, notably for non-stationary satellites, further require a scanning system in order to produce an image in one or more spectral bands.

Figure 1:
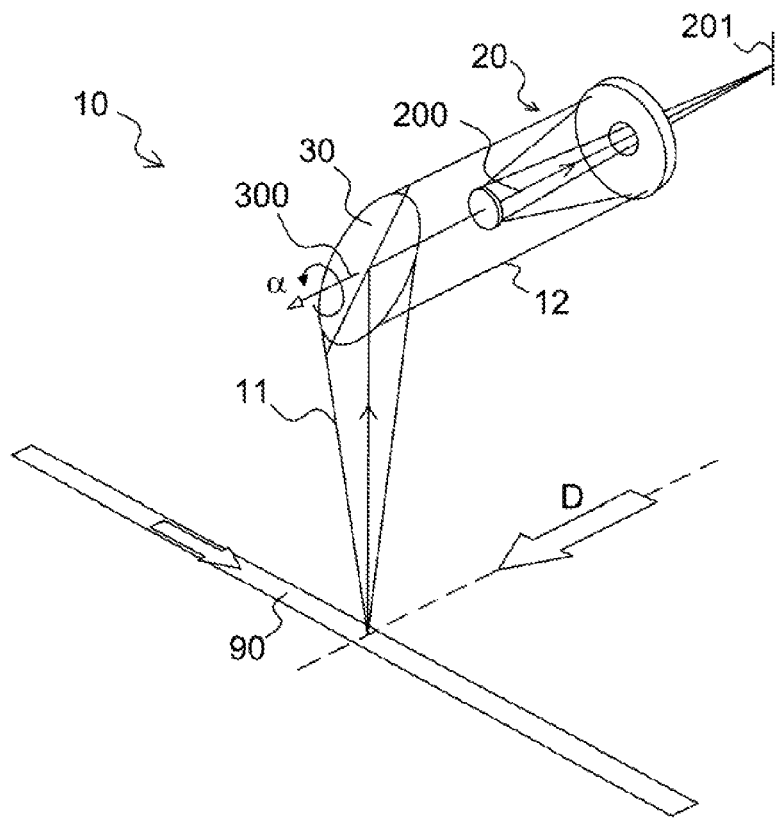

FIG. 1 represents an example of a scanning optical system 10, installed on a non-stationary satellite such as the "Advanced Very High Resolution Radiometer" (AVHRR) optical system installed on the Met-Op (Meteorological Operational) satellites. The optical system 10 comprises a telescope 20, of Cassegrain type, having an optical axis 200 parallel to the speed vector $\vec{V}$ of the satellite, that is to say parallel to a direction D of travel of the satellite. The optical system 10 further comprises a scanning mirror 30, rotating on an axis of rotation 300 merged with the optical axis 200 of the telescope 20. The scanning mirror 30 is arranged to receive an incident beam of rays 11, originating from an observed scene portion 90, and return a reflected beam of rays 12 along the optical axis 200 of said telescope. At the output of the telescope, the beam of rays is focused in a focal plane 201 of the telescope 20. The image of the scene portion 90 is observed in the focal plane 201 of the telescope 20 by a detector (not represented), for example of charge-coupled camera type, called CCD camera ("Charge Coupled Device").

The scanning mirror 30 is inclined relative to the optical axis 200 of the telescope. In the example of FIG. 1, said scanning mirror has a normal oriented at 45° relative to the optical axis 200 of the telescope. The angle formed, at the scanning mirror 30, between the incident beam of rays 11 and the reflected beam of rays 12 is 90°.

The scanning mirror 30 is controlled by a motor (not represented), for example with reciprocating or continuous movement. Such a configuration thus allows for a line scan at right angles to the direction D of travel of the satellite.

The drawback with such a scanning optical system lies in the fact that the rotation of the scanning mirror 30, by an angle $\alpha$ about the optical axis 200 of the telescope, leads to a rotation of the image obtained in the focal plane 201 of the telescope 20, by an angle equal to the angle $\alpha$ of rotation of the scanning mirror. Thus, the juxtaposition of two successive scanning lines makes it possible to obtain a regular coverage only for an angle $\alpha$ close to zero.

Solutions do exist for compensating such a rotation of the image in the focal plane.

Figure 2:
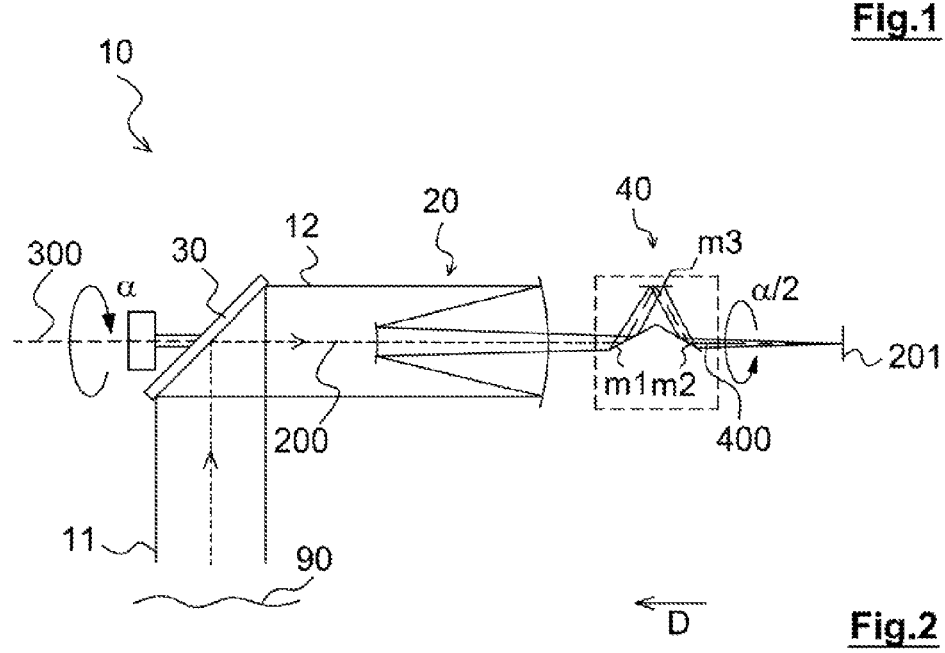

One known solution consists in providing a set of prisms or mirrors, involving at least three reflecting surfaces, and inserted between the telescope 20 and its focal plane 201. An example is illustrated in FIG. 2. FIG. 2 is distinguished from FIG. 1 by the interposition on the optical axis 200 of the telescope 20, downstream of said telescope and upstream of the focal plane 201, that is to say between the telescope and the focal plane, of an optical image rotation device 40. Said optical image rotation device comprises two inclined mirrors m1 and m2, positioned on the optical axis 200 of the telescope, transversely facing a mirror m3 parallel to said optical axis 200 of the telescope 20. The arrangement of the three mirrors m1, m2, m3 is a so-called lying K arrangement. Such an optical image rotation device is generally called de-rotator. The passage of an optical beam from the telescope 20 through this optical image rotation device generates a symmetry of the image relative to a plane parallel to the mirror m1.

The optical image rotation device 40 is rotary, with an axis of rotation 400 merged with the optical axis 200 of the telescope. The optical image rotation device 40 is controlled by a motor (not represented), with reciprocating or continuous movement. A rotation of said optical image rotation device by an angle of $\alpha$ relative to the optical axis 200 creates a rotation of the image in the focal plane 201 by an angle $2\alpha$.

Thus, to compensate the rotation of the image in the focal plane, when the scanning mirror 30 performs a rotation by an angle $\alpha$ about the optical axis, the optical image rotation device 40 must perform a rotation by an angle of $\alpha/2$ about the optical axis, in the same direction as the rotation of the scanning mirror.

To sum up, to perform a line scan, the optical image rotation device 40 is actuated by a motor rotating at a speed that is half that of the motor 50 of the scanning mirror 30, in order to generate an image rotation opposite to that generated by the scanning mirror 30.

Other examples, that make it possible to compensate the rotation of the scanning mirror 30, more complex than the lying K arrangement, involve an optical image rotation device comprising a greater number of reflecting surfaces. The U.S. Pat. No. 4,929,040, which describes an optical image rotation device comprising five mirrors, can, for example, be cited.

However, these optical systems comprising an optical image rotation device, regardless of the number of mirrors, entail a significant bulk and cost.

SUMMARY OF THE INVENTION

The object of the present invention is to mitigate these drawbacks and propose an optical system comprising:
  a rotary scanning mirror, arranged in such a way as to receive an incident beam of rays and return a beam of rays, called input beam, along a given axis, called first axis,
  an optical instrument arranged in such a way as to receive the input beam from the scanning mirror, and to return a beam of rays, called output beam, along a given axis, called second axis,
  an optical image rotation device, positioned on the second axis and arranged in such a way as to receive the output beam.

According to the invention, the optical instrument is arranged in such a way as to return the output beam parallel to the input beam, in a direction of propagation opposite to said input beam, towards the optical image rotation device. The scanning mirror is arranged in such a way as to have an axis of rotation aligned and merged with the first axis. The optical image rotation device is arranged in such a way as to have an axis of rotation aligned and merged with the second axis. The optical system further comprises a rotational driving means common to the scanning mirror and to the optical image rotation device about their respective rotation axes.

Such an optical system advantageously allows for the observation of a targeted scene portion. An image of the targeted scene portion is observed in an image plane of the optical instrument by a detector.

The scanning mirror is oriented in such a way that the rays of the incident beam form, just after reflection on said scanning mirror, a beam of rays which has a first direction of propagation.

In the context of the present invention, direction of propagation of a beam of rays should be understood to mean the mean direction of the propagation of its rays. The beam of rays can have an angular aperture, notably when it is a divergent or convergent beam. In this case, its direction of propagation is the direction of a central longitudinal axis of the beam.

Thus, the first axis should be understood to mean a central longitudinal axis of the input beam. And, second axis should be understood to mean a central longitudinal axis of the output beam.

According to the invention, the first and second axes are parallel and not merged; the output beam emerges from the optical instrument parallel to but not merged with the input beam.

The optical image rotation device is configured to compensate a rotation, in the focal plane, of the image of the targeted scene portion due to the rotation of the scanning mirror.

According to a particularly advantageous arrangement, the optical image rotation device comprises a set of N mirrors, N being odd and equal to or greater than three.

Preferably, the scanning mirror is configured to perform a rotation by a predefined angle about the first axis to perform a scan of a targeted scene portion and, for its part, the optical image rotation device is configured to perform a rotation, about the second axis, by an angle that is half the angle of rotation of the scanning mirror.

Unlike the existing optical systems in which the scanning mirror and the optical image rotation device are positioned on either side of the optical instrument, the optical system of the invention has an optical image rotation device positioned in proximity to the scanning mirror.

By virtue of the configuration of the optical instrument and the relative positioning of the image rotation device relative to the scanning mirror, the overall dimensions of the optical system are reduced. The optical system now extends over a short length, substantially equivalent to a focal distance of the optical instrument. Consequently, the optical system of the invention is particularly compact.

Furthermore, the optical system of the invention has only a single rotational driving means, common to the scanning mirror and to the optical image rotation device. This limitation on the number of driving means contributes to reducing the bulk and the weight of the optical system as a whole.

Such an optical system can easily be used on a non-stationary satellite, for example planetary or terrestrial, for scanning space observation. The optical system can then be positioned on the satellite in such a way that the image plane of the optical instrument, in which the image detector is located, is at right angles to a direction of travel of the satellite. Furthermore, through its compactness, the optical system of the invention is particularly suitable for installation in a restricted housing volume onboard the satellite.

According to preferred embodiments, the invention further addresses the following features, implemented separately or in each of their technically feasible combinations.

According to a particularly advantageous arrangement, the optical instrument is a telescope comprising at least three reflecting mirrors.

In a preferred embodiment, in the interests of compactness and ease of production of the optical system, the telescope comprises three reflecting mirrors.

The reflecting mirrors are situated in succession on a path of the rays between the scanning mirror and the optical image rotation device, with a first reflecting mirror positioned on the first axis to receive the input beam and a last reflecting mirror positioned on the second axis to focus the output beam along said second axis.

According to an advantageous feature, the optical system comprises a means for rotationally coupling the scanning mirror and the optical image rotation device, associated with the common rotational driving means. The scanning mirror and the optical image rotation device are coupled together in such a way that one drives the other in rotation. In this way, an angular speed of rotation of the optical image rotation device and an angular speed of rotation of the mirror are mutually synchronized to ensure a perfect correction of the image rotation in the image plane.

According to a particularly advantageous arrangement, the common rotational driving means is associated with the scanning mirror. Thus, the optical image rotation device is driven in rotation by the rotational driving means of the scanning mirror.

According to an advantageous feature, the rotational coupling means has a transmission ratio between the angular speed of rotation of the scanning mirror and the angular speed of rotation of the optical image rotation device of two.

According to an advantageous feature, to reduce the disturbing torques induced by the rotation of the scanning mirror and that of the optical image rotation device, the optical system comprises a torque compensation device coupled to the mutual rotational coupling means.

According to a particularly advantageous embodiment, the rotational coupling means is a rollers and belt system. A roller is associated with the axis of rotation of the scanning mirror, a roller is associated with the axis of rotation of the optical image rotation device and a belt cooperates with the two rollers to transmit the rotational movement.

According to another particularly advantageous embodiment, the coupling means comprises a geared system.

PRESENTATION OF THE FIGURES

Figure 6:
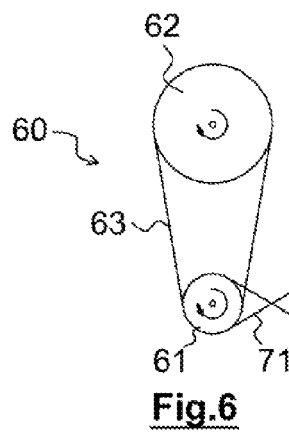
Figure 7:
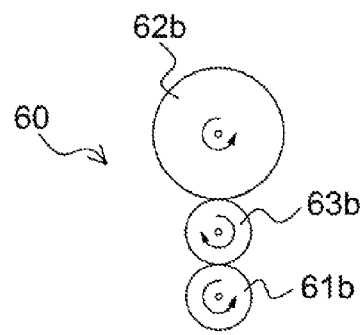
Figure 8:
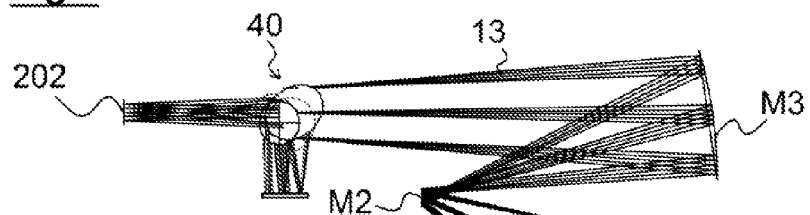
Figure 8:
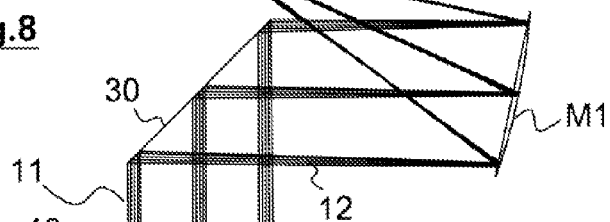
Figure 9:
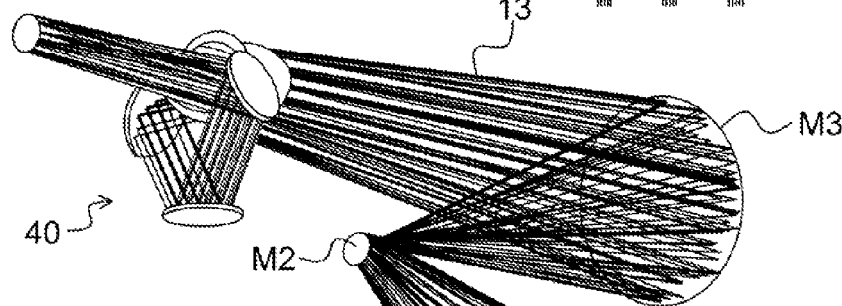
Figure 9:
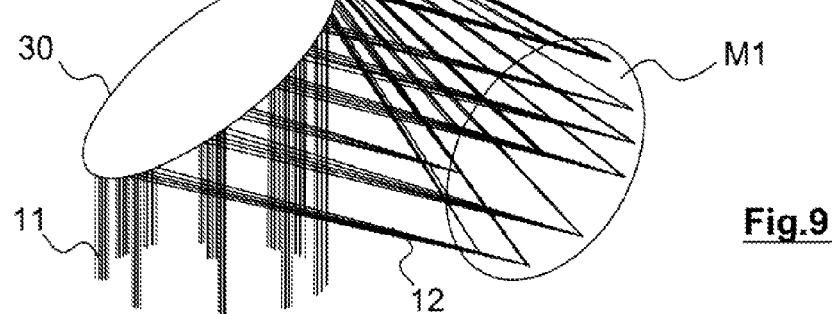

The following description of the invention is given with reference to the figures, in which identical references denote identical or analogous elements, which represent, in a non-limiting manner:

FIG. 1: already described, a perspective schematic view of an optical system of the prior art, FIG. 2: already described, a schematic representation of an optical system of the prior art, comprising an optical image rotation device, FIG. 3a: a schematic representation of an optical system according to the invention, FIG. 3b: a view of the optical system of FIG. 3a, along a cross section CC, FIG. 4: a perspective view of a rotational coupling means according to one embodiment, FIG. 5: a perspective overview of the rotational coupling means according to the embodiment of FIG. 4, associated with an optical image rotation device, FIG. 6: a schematic representation of the rotational coupling means, according to the embodiment of FIG. 4, coupled to a torque compensation device, FIG. 7: a schematic representation of a rotational coupling means coupled to a torque compensation device, according to another embodiment, FIG. 8: a schematic representation of the propagation of a beam of rays through an optical system according to one embodiment and comprising an optical image rotation device comprising a set of five mirrors, FIG. 9: a perspective representation of the propagation of a beam of rays through the optical system of FIG. 8.

Identical references in the different figures denote identical elements.

DETAILED DESCRIPTION OF EMBODIMENTS OF THE INVENTION

The present invention relates to an optical system 100.

The present invention is applicable to any optical system, in particular to the optical systems implemented for space observation (earth, planetary, stellar observation, etc.) and installed onboard spacecraft, such as non-stationary satellites.

FIG. 3a schematically illustrates an optical system 100 making it possible to ensure a line scan of an observed scene portion 90, according to a particular embodiment.

The non-stationary satellite, onboard which the optical system is installed, orbits according to an axis of travel and a direction of travel, illustrated by the arrow D, at a predefined speed.

For reasons of clarity, the components of the optical system, notably the supports of the mirrors, which are not necessary to an understanding of the invention, are not represented in FIGS. 3a to 9.

The optical system 100 comprises:
- a scanning mirror 30,
- three reflecting mirrors, called first M1, second M2 and third M3 reflecting mirrors, together forming an optical instrument of telescope type 20, for example a Korsch telescope,
- an image detector, called detector (not represented).

A beam of rays, called incident beam 11, originating from points of a targeted scene portion 90, is reflected first by the scanning mirror 30, then, in succession, by each of the three reflecting mirrors M1, M2, M3.

The detector is positioned after the third reflecting mirror to capture the final image formed of the scene portion. Preferentially, the detector has a detection surface arranged in an image plane 202 of the telescope 20.

The scanning mirror 30 is inclined relative to a central longitudinal axis 111 and a direction of propagation of the incident beam 11. The scanning mirror 30 is arranged in such a way that the incident beam 11 which originates from the scene portion 90 is reflected by said scanning mirror, along a given central longitudinal axis 121 and in a given direction of propagation, that are different from the central longitudinal axis 111 and the direction of propagation of the incident beam 11.

The beam of rays reflected by the scanning mirror 30 is called input beam 12. Its central longitudinal axis 121 and its direction of propagation are called first axis 121 and first direction of propagation.

The first axis 121 is parallel to the axis of travel of the satellite and the first direction of propagation is opposite to the direction of travel D of the satellite, as illustrated in FIG. 3a.

The scanning mirror 30 is preferably a planar mirror having a first surface, called reflecting surface 31, of optical axis 33.

In the nonlimiting example illustrated in FIG. 3, the scanning mirror 30 is oriented in such a way that the central longitudinal axis 111 of the incident beam 11 forms an angle of substantially 90° with the first axis 121. The central longitudinal axis 111 of the incident beam 11 forms an angle of substantially 45° with the optical axis 33 of the scanning mirror 30, after reflection on said scanning mirror, and the first axis 121 of the input beam 12 forms an angle of substantially 45° with the optical axis 33 of the scanning mirror.

The first reflecting mirror M1 is arranged on the first axis 121, in a first direction of propagation, in such a way as to return the input beam 11 towards the second reflecting mirror M2.

The second reflecting mirror M2 is positioned on the path of the beam of rays returned by the first reflecting mirror M1 and the third reflecting mirror M3 is positioned on the path of the beam of rays returned by the second reflecting mirror M2.

The second M2 and third M3 reflecting mirrors are arranged relative to the first reflecting mirror M1 in such a way as to orient the beam of rays along a central longitudinal axis and a defined direction of propagation.

The third reflecting mirror M3 is arranged and oriented in such a way as to return a beam of rays, called output beam 13, along a central longitudinal axis, called second axis 131, substantially parallel to the first axis 121. The third reflecting mirror M3 is also arranged in such a way as to return the output beam 13 with a direction of propagation, called second direction of propagation, opposite to the first direction of propagation.

In other words, the three reflecting mirrors M1, M2, M3 are configured in such a way that the first axis 121 and the second axis 131 are mutually parallel and not merged.

Although the telescope 20 is illustrated in FIG. 3 and described with three reflecting mirrors, the number of these reflecting mirrors is not limited to that described and illustrated. Thus, it is possible, without departing from the framework of the invention, to produce a telescope with a number of reflecting mirrors greater than three, provided that the output beam 13, at the output of the telescope 20, is parallel to the input beam 12, at the input of the telescope 20, with an opposite direction of propagation.

At the output of the telescope 20, the output beam 13 is focused in the image plane 202 of said telescope.

The detector is positioned on the second axis 131. Said detector has a detection surface oriented at right angles to said second axis, and positioned in the image plane 202 of the telescope 20.

The detector is, in a preferred exemplary embodiment, a charge-coupled camera, called CCD camera.

Preferably, as illustrated in FIG. 3a, the detection surface of the detector is situated in proximity to the scanning mirror 30.

According to the invention, the scanning mirror 30 is driven in rotation, at a predetermined speed $V_{30}$, about an axis of rotation 300 merged with the first axis 121.

The rotation of said scanning mirror makes it possible to perform a line scan, at right angles to the axis of travel of the satellite, and to cover, over a determined angular sector, a succession of scene portions.

The scanning mirror 30 is driven in rotation about the first vertical axis by a rotational driving means 50, such as, for example, an electric drive motor.

To compensate the rotation of the image induced by the rotation of the scanning mirror 30 about the first axis 121, the optical system 100 further comprises an optical image rotation device 40. Said optical image rotation device is positioned on the second axis 131, between the third mirror M3 and the detection surface of the detector. The optical image rotation device 40 is arranged in such a way as to receive all of the output beam 13.

The optical image rotation device 40 comprises a set of N mirrors, N being odd and greater than or equal to three.

In preferred exemplary embodiments, the optical image rotation device 40 comprises a set of three mirrors or of five mirrors, as described previously. FIGS. 8 and 9 illustrate an optical system comprising an optical image rotation device comprising a set of five mirrors.

Preferably, the optical image rotation device 40 is contained in a support block, called derotator block 41, as illustrated in FIG. 5. Said derotator block is dimensioned to position and maintain the mirrors relative to one another.

According to the invention, the optical image rotation device 40 is positioned in proximity to the scanning mirror 30.

FIGS. 8 and 9 represent, by way of illustration, the operation of an optical system according to one embodiment of the invention. The telescope comprises three reflecting mirrors and the optical image rotation device comprises a set of five mirrors. In these figures, a number of rays have been represented, which originate from a number of points of a scene portion situated in a direction of sight of the telescope. These rays illustrate the optical operation of the optical system, in a way that is usual to those skilled in the art.

The optical image rotation device 40 is driven in rotation, via a rotation of the derotator block 41, at a predetermined speed $V_{40}$, about an axis of rotation 400 merged with the second axis 131.

Thus, the axes of rotation of the optical image rotation device 40 and of the scanning mirror 30 are parallel and not merged.

Advantageously, the rotation of the optical image rotation device 40 and of the scanning mirror 30 is performed using the same rotational driving means.

According to a preferred arrangement, to avoid disturbing the propagation of the output beam that has to pass right through the optical image rotation device 40, the rotational driving means 50 is associated with the scanning mirror.

The rotational driving means 50 is preferentially situated on the first axis 121, on the side of a surface 32 opposite to the reflecting surface 31 of the scanning mirror 30.

In an advantageous arrangement of the optical system 100, the rotational driving means 50 and the optical image rotation device 40 are kept secured together by a single support structure 64, as illustrated in FIG. 5. Such an arrangement makes it possible to keep a constant centre-to-centre distance between the axis of rotation 400 of the optical image rotation device 40 and the axis of rotation 300 of the scanning mirror 30.

The rotational driving means 50 is associated with a rotational coupling means 60 for the scanning mirror 30 and for the optical image rotation device 40.

In a first embodiment of the rotational coupling means 60, said rotational coupling means comprises a pulley and belt system as illustrated in FIGS. 3a, 3b, 4 and 5, comprising:

a first roller, called driving roller 61, of diameter d, secured in rotation to an output shaft of the rotational driving means 50, the axis of which is the axis of rotation 300 of the scanning mirror 30, a second roller, called driven roller 62, secured in rotation to the derotator block 41, a belt 63 cooperating with the driving roller 61 and the driven roller 62.

The driven roller 62 is linked by the belt 63 to the driving roller 61 to drive the optical image rotation device 40 in rotation in one and the same direction as that of the scanning mirror 30.

As described previously, to compensate the rotation of the image in the image plane, due to the rotation of the scanning mirror 30, when the scanning mirror 30 performs a rotation by an angle α about its axis of rotation 300, the optical image rotation device 40 has to perform a rotation by an angle of α/2 about the second axis, in the same direction as the rotation of the scanning mirror 30.

In other words, to perform a line scan, the optical image rotation device 40 has to rotate at a speed $V_{40}$ that is half of that of the scanning mirror, in order to generate an image rotation opposite to that generated by the scanning mirror.

Consequently, the diameter of the rollers is defined in such a way that the driving ratio of the angular speeds of rotation $V_{30}$, $V_{40}$ of the scanning mirror 300 and of the optical image rotation device 40 has a factor of two, which leads to a ratio of diameters of the rollers of factor two also. In other words, the diameter of the driven roller 62 is twice the diameter d of the driving roller 61.

Such a configuration makes it possible to synchronize the angular speeds of rotation $V_{30}$, $V_{40}$ of the scanning mirror 30 and of the optical image rotation device 40.

In one embodiment of the rotational coupling means 60, to avoid slippage of the belt 63 on the driving 61 and driven 62 rollers, and thus ensure a perfect image rotation correction, the belt 63 is mechanically fixed to at least one of the two rollers. In the nonlimiting example illustrated in FIGS. 4 and 5, the belt 63 is fixed to the driving roller 61. Such an embodiment does, however, present the drawback of a limited range of angular rotation, which imposes a reciprocating motion on the scanning mirror 30 and the optical image rotation device 40.

In an improved exemplary embodiment, associated with this first embodiment of the rotational coupling means 60, in order to compensate the disturbing torques induced by the rotation of the scanning mirror 30 and of the optical image rotation device 40, the optical system 100 comprises a torque compensation device 70, as illustrated in FIG. 6.

The torque compensation device 70 comprises a belt 71 cooperating with either the driving roller 61, or the driven roller 62, and a third roller 72. The third roller 72 is secured in rotation to a shaft of a part (not represented) that can move in rotation, of an axis parallel to and not merged with the first and second axes. The part that can move in rotation is secured to the single support structure 64.

In the example of FIG. 6, the belt 71 cooperates with the driving roller 61.

The third roller 72 is linked by the belt 71 to the driving roller 61 or to the driven roller 62 and is driven in rotation in a direction opposite to that of the scanning mirror 30 or of the optical image rotation device 40.

The third roller 72 is configured in such a way as to supply a rotational inertia equivalent to the sum of the rotational inertias of the scanning mirror 30, of the optical image rotation device 40 and of the rotational driving means 50. Thus, the compensation torque created by the compensation device compensates the effect of the disturbing torques induced likewise by the rotation of the scanning mirror 30, that of the optical image rotation device 40 and that of the rotational driving means 50.

Calculating the rotational inertia of the third roller 72 lies within the scope of those skilled in the art. The third roller 72 is dimensioned (weight, diameter, speed of rotation, etc.) as a function of the desired inertia.

In a second embodiment of the rotational coupling means 60, said coupling means comprises a geared system, as illustrated in FIG. 7.

The geared system comprises:
- a first toothed wheel, called driving wheel 61b, secured in rotation to the output shaft of the rotational driving means 50, the axis of which is the axis of rotation 300 of the scanning mirror 30,
- a second toothed wheel, called driven wheel 62b, secured in rotation to the de-rotator block 41,
- a third toothed wheel, called intermediate wheel 63b, cooperating with the driving 61b and driven 62b wheels, by the action of teeth successively in contact.

As described previously, given the relative positioning of the optical image rotation device 40 relative to the scanning mirror, said optical image rotation device has to perform a rotation about the second axis 131, in the same direction as the rotation of the scanning mirror 30 about the first axis 121.

Thus, to drive the optical image rotation device 40 in rotation in one and the same direction as that of the scanning mirror 30, the intermediate wheel 63b performs a rotation in a direction of rotation opposite to the rotation of the driving and driven wheels 61b, 62b.

Similarly, to compensate the rotation of the image in the image plane, due to the rotation of the scanning mirror 30, a diameter of the driven wheel 62b is twice a diameter of the driving wheel 61b.

The diameters of the driving wheel 61b and of the driven wheel 62b are defined in such a way that the driving ratio of the angular speeds of rotation $V_{30}$, $V_{40}$ of the scanning mirror 30 and of the optical image rotation device 40 has a factor of two.

Advantageously, by associating a rotational inertia with the intermediate wheel 63b that is equivalent to the sum of the rotational inertias of the scanning mirror 30 and of the optical image rotation device 50, the intermediate wheel 63b serves as torque compensation device.

The intermediate wheel 63b is configured in such a way as to supply a rotational inertia that is equivalent to the sum of the rotational inertias of the scanning mirror 30, of the optical image rotation device 40 and of the rotational driving means 50.

Calculating the rotational inertia of the intermediate wheel lies within the scope of those skilled in the art. The intermediate wheel is dimensioned (weight, diameter, speed of rotation, etc.) as a function of the desired inertia.

Such a geared system offers a limited bulk and reasonable complexity and production costs.

According to one embodiment of the invention, to control the position and the angular speed of rotation of the scanning mirror 30 and of the optical image rotation device, the optical system 100 further comprises an optical coder 80, secured in rotation to the output shaft of the rotational driving means 50.

The above description clearly illustrates that, through its different features and their advantages, the present invention achieves the objectives that were set for it. In particular, it proposes an optical system for space observation that makes it possible to ensure a scanning of the targeted scene without rotation of the image in the image plane, while exhibiting a lesser bulk compared to the existing optical systems, and while improving the synchronization of the rotation of the scanning mirror and of the optical image rotation device through the use of a rotational driving means common to said scanning mirror and to said optical image rotation device.

The invention claimed is:

1. Optical system comprising:
a rotary scanning mirror arranged to receive an incident beam of rays and to return an input beam along a first axis, the rotary scanning mirror has an axis of rotation aligned on the first axis;
an optical instrument arranged to receive the input beam from the scanning mirror and to return an output beam along a second axis;
an optical image rotation device positioned on the second axis and arranged to receive the output beam, the optical image rotation device has an axis rotation aligned on the second axis;
a rotational driving device common to the scanning mirror and to the optical image rotation device about their respective rotation axes; and
wherein the optical instrument returns the output beam parallel to the input beam, in a direction opposite to the input beam, towards the optical image rotation device.

2. Optical system according to claim 1, further comprising a rotational coupling device to rotationally couple the scanning mirror and the optical image rotation device, the rotational coupling device being associated with the common rotational driving device.

3. Optical system according to claim 2, wherein the rotational coupling device has a transmission ratio of two between an angular speed of rotation of the scanning mirror and an angular speed of rotation of the optical image rotation device.

4. Optical system according to claim 2, further comprising a torque compensation device coupled to the rotational coupling device.

5. Optical system according to claim 2, wherein the rotational coupling device is a rollers and belt system.

6. Optical system according to claim 2, wherein the rotational coupling device comprises a geared system.

7. Optical system according to claim 1, wherein the optical instrument is a telescope comprising at least three mirrors.

* * * * *